Patented Apr. 13, 1948

2,439,447

UNITED STATES PATENT OFFICE 2,439,447

TURBINE BEARING CONSTRUCTION

Richard S. Buck, Glastonbury, and Walter A. Ledwith, Hartford, Conn., assignors to United Aircraft Corporation, East Hartford, Conn., a corporation of Delaware Application January 28, 1944, Serial No. 520,065

14 Claims. (Cl. 308—77)

1

The copending application of Cronstedt, Serial No. 486,617, filed May 11, 1943, now Patent No. 2,425,177, shows a turbine in which the power gas is discharged through a duct surrounding a bearing for the rotor. This bearing is supported within a housing which also supports the nozzle-carrying casing. A feature of the present invention is the supply of fluid to this bearing either for cooling or for lubricating the bearing.

Another feature is the supply of fluid to the interior of the shaft adjacent the bearing to aid in cooling the bearing.

Leakage of power gas into the bearing at the end of the power section of the turbine is prevented by introducing sealing air into the labyrinth seal which surrounds the rotor between the power section and the bearing. A feature of the invention is the supply of sealing air to the seal from a point externally of the bearing support.

Other objects and advantages will be apparent from the specification and claims, and from the accompanying drawing which illustrates what is now considered to be a preferred embodiment of the invention.

Figure 1:
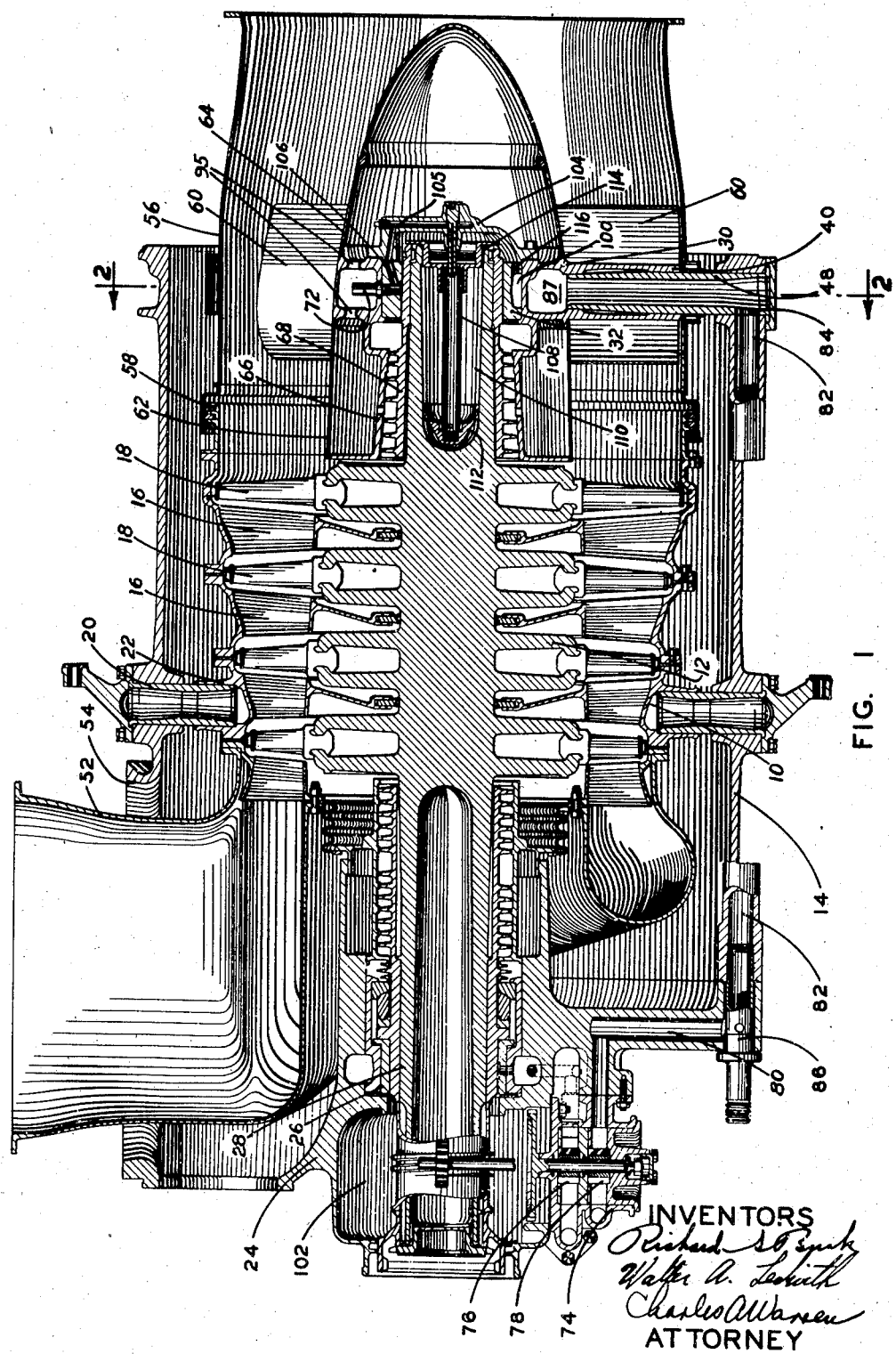
Fig. 1 is a sectional view through the turbine, the rear end bearing section being on the line 1—1 of Fig. 2.

The turbine shown has a casing 10 and a rotor 12, both supported by a housing 14. Casing 10 has several parallel rows of circumferentially spaced nozzle-forming vanes 16 which alternate with rows of blades 18 on the rotor. The part of the rotor having these blades and the part of the casing having the vanes constitute the power section of the turbine.

Casing 10 is supported by radial pins 20 in the housing and engaging bosses 22 in the casing. These pins are all in the same radial plane and constitute the sole support for the casing. The casing is free to expand axially within the housing and is smaller in diameter than the housing at its plane of support, thus permitting the casing to expand radially without destroying its concentric alignment. Clearance is provided at the inner ends of pins 20 for radial expansion of the casing.

Housing 14 has a head 24 which forms a part of the housing and supports a bearing 26 for the front end of the turbine shaft 28 integral with

2 and forming a part of the rotor. At the other end of the rotor, housing 14 has a mounting 30 within which is a bearing 32 for the shaft. Mounting 30 has a number of legs 34, 36, 38, and 40 engaging radial supporting pins 42, 44, 46, and 48 mounted in the housing and held in position by caps 50.

Power gas is conducted into casing 10 by an intake scroll 52 connected to the casing 10 and extending through an opening 54 in the housing to connect with an inlet pipe not shown. The scroll is spaced from housing 14 and head 24 so that transfer of heat from the scroll to the housing is minimized. At the discharge end of the casing, power gas is discharged through a duct 56 which surrounds mounting 30. The inner end of the duct may engage resilient sealing rings 58 in grooves in casing 10 so that axial expansion of the casing does not affect the position of the duct.

The outer ends of the legs on mounting 30 engage with the duct and support the duct in concentric relation to the mounting. The supporting pins 42, 44, 46, and 48 extend through openings in the duct and hold the duct in axial position within the housing.

The path for power gas discharging from the turbine is within the duct and between the legs on the mounting. Each leg may have a surrounding shield 60 which is streamlined to minimize the resistance to the gas flow. These shields, in conjunction with shields 62 and 64 around the mounting, prevent overheating of the mounting by the power gas.

Figure 3:
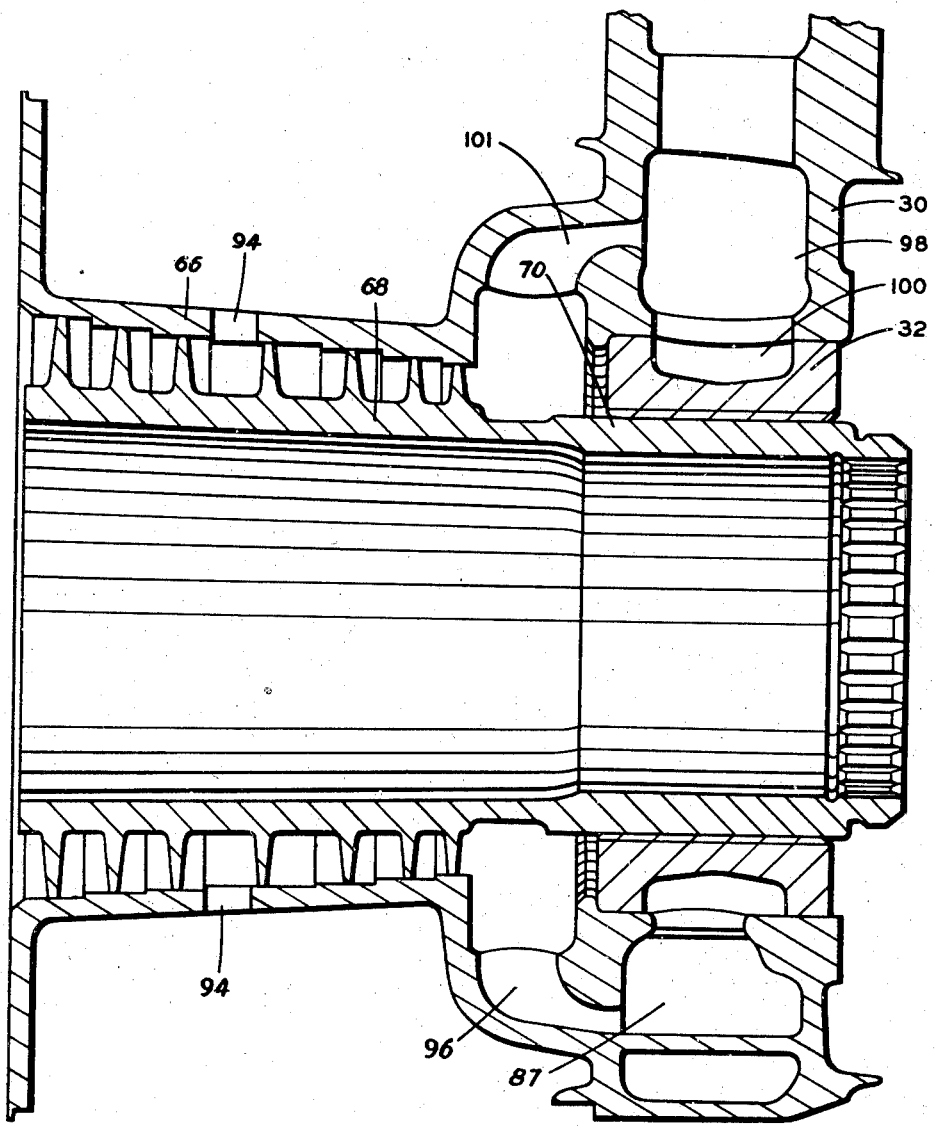
Fig. 3 is a sectional view on the line 3—3 of Fig. 2.

Mounting 30 carries the outer element 66, Fig. 3, of a labyrinth seal, the inner element 68 of which is mounted on and rotates with turbine shaft 28. Inner element 68 may be integral with a bearing sleeve 70 on the shaft which engages with bearing 32 in mounting 30. Gas under pressure is admitted to this seal between its ends for preventing leakage of power gas through the seal.

Figure 2:
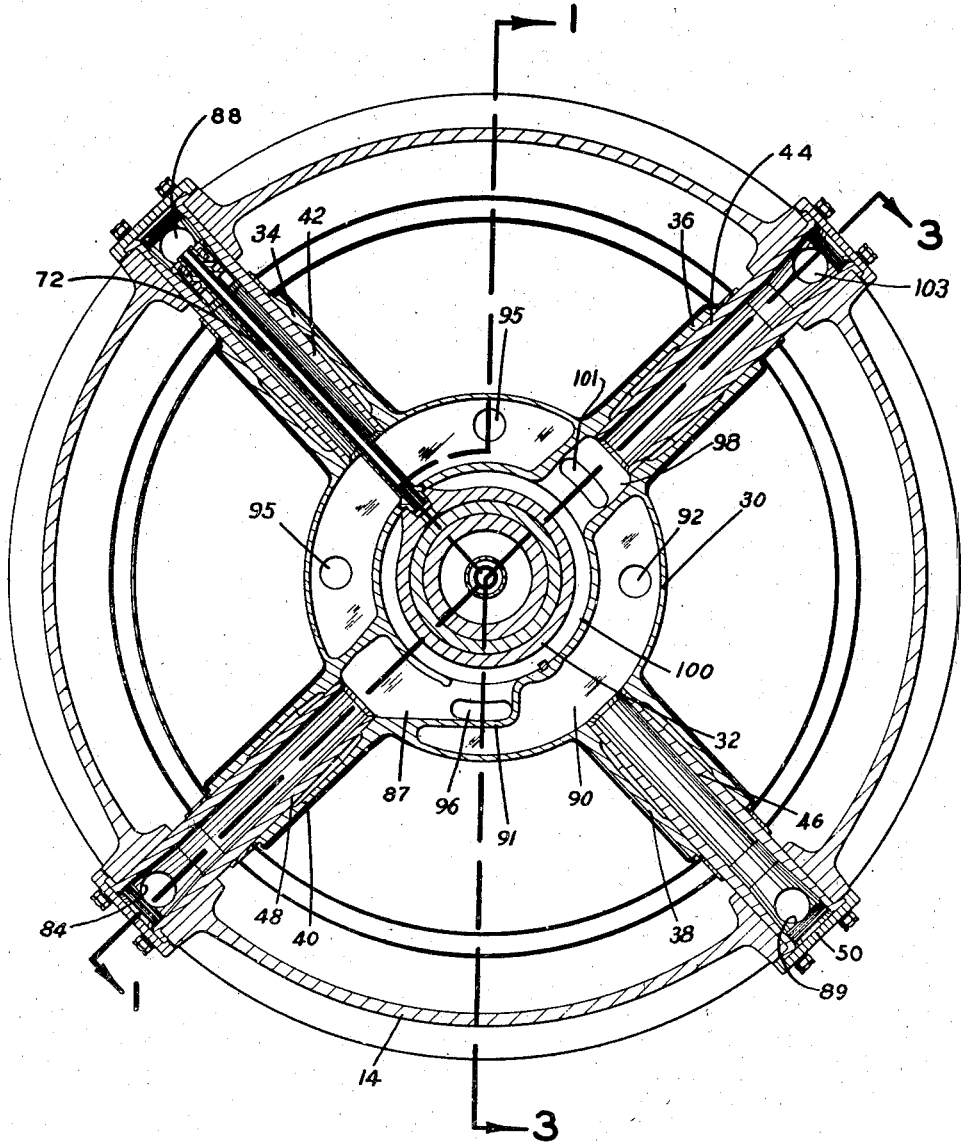
Fig. 2 is a sectional view through the rear bearing and its supporting structure on line 2—2 of Fig. 1.

Lubricant for bearing 32, coolant for the end of turbine shaft 28 and sealing air for the labyrinth seal are admitted to the mounting through the radial supporting pins which are made hollow to form passages for the fluids. As shown in Fig. 2, leg 34 of mounting 30 has an oil inlet pipe 72, the inner end of which is threaded in a boss in bearing 32.

To supply lubricant, head 24 has mounted thereon an oil pump casing 74, Fig. 1, having gear pumps 76 and 78 which may be driven directly from the turbine rotor.

Pump 78 which scavenges oil from mounting 30 is connected by a passage 80 in head 24 and passage 82 in housing 14 to the outer end of pin 48 which has a side opening 84 in line with passage 82. A transfer pin 85 connects passages 80 and 82. When pump 78 is operating, oil is thus pumped out of a recess 87 in mounting 30 in which the oil collects.

Lubricant from pump 76 which supplies oil to the bearing is directed through passages not shown similar to passages 80 and 82 in head 24 and housing 14. These passages connect with the outer end of pin 42 in which tube 72 is mounted. A radial opening 88 in this pin is in line with the oil passage in the housing.

Housing 14 may have a third passage similar to passages 80 and 82 through which sealing air for the labyrinth seal is admitted. This passage connects with the side opening 89 in the hollow pin 46 which admits fluid to a chamber 90 adjacent bearing 32. This chamber is separated from recess 87 by a wall 91.

From chamber 90, sealing air passes through an opening 92, Fig. 2, into the space within shield 62, and through ports 94 in the outer element of the labyrinth seal. This air pressure is higher than the pressure within the turbine adjacent to the seal, and air working through the seal into the turbine prevents power gas from leaking through the seal. Sealing air within shield 62 may also reach the space within shield 64 through openings 95, Figs. 1 and 2, in mounting 30.

As shown in Fig. 3, the space between bearing 32 and the end of the labyrinth seal is connected by a channel 96 to the chamber 87 at the inner end of pin 48 through which oil is scavenged.

The fourth radial supporting pin 44 connects at its inner end with a chamber 98 within the mounting. This chamber intersects a groove 100 in bearing 32 and thus vents chamber 87 at the inner end of scavenge pin 48. A passage 101 in mounting 30 connects with the space between the seal and the bearing for venting this space.

Pin 44 has a side opening 103 at its outer end that connects with another passage in housing 14 and head 24 similar to passages 82 and 80. This passage enters a chamber 102 in head 24 which surrounds the rotor shaft and into which oil from the front bearing 24 drains. This chamber may be scavenged by a pump, not shown, similar to pump 78. Chamber 102 may be vented, or a constant pressure may be maintained in the chamber as described in the copending application of Ledwith, Serial No. 520,064, filed January 28, 1944. Both chambers 98 and 102 are under the same pressure through the interconnecting passage in housing and head.

In addition to lubricating the bearing, and supplying air to the seal, fluid is also circulated through the end of the turbine shaft for cooling. Mounting 30 has a cap 104 having a passage 105 connecting with a cross-channel 106 in bearing 32 through which a part of the lubricant delivered to the bearing may be supplied to a tube 108 extending into a recess 110 in the end of the shaft. This tube delivers the oil which functions as a coolant to the inner end of the recess where it is discharged over a baffle 112 to flow along the sides of the recess and escape through grooves 114 in the end of the shaft to the inside of the cap. One or more channels 116 in bearing 32 connect the space within the cap to chamber 100 which, as shown in Fig. 2, is connected with scavenge chamber 87.

It is to be understood that the invention is not limited to the specific embodiment herein illustrated and described, but may be used in other ways without departure from its spirit as defined by the following claims.

We claim:

1. A turbine construction including a housing, a rotor within the housing, a bearing for said rotor, a mounting for said bearing, a labyrinth seal around said rotor, pins extending inwardly from the housing and fitting in said mounting to support the mounting within and spaced from the housing, said rotor having a recess through which coolant is circulated, and means for admitting lubricant to the bearing, coolant to said recess and fluid for the seal through said pins, the pins being hollow to provide fluid connections from the housing to the mounting.

2. A bearing construction including a housing member, a rotor, a bearing for said rotor, a mounting member for said bearing located within the housing member, removable pins extending inwardly from said housing member and engaging and supporting said mounting member, said pins being slidable in one of said members to provide for relative expansion between said members, and means for supplying fluid to said bearing through one of said pins, said one pin having a longitudinal passage therein for the fluid.

3. A bearing construction including a housing member, a rotor, a bearing for said rotor, a mounting member for said bearing located within the housing member, removable pins extending inwardly from said housing member and engaging and supporting said mounting member, said pins being slidable in one of said members to provide for relative expansion between said members, and means for supplying fluid to said bearing through one of said pins, said one pin having a longitudinal passage therein for the fluid, said housing having a passage therein connecting with said one pin adjacent its outer end.

4. A turbine construction including a housing member, a rotor, a bearing for said rotor, a mounting member for said bearing separate from and located within the housing, said mounting member having legs between which is a path for power fluid, removable pins extending inwardly from said housing member and fitting within the legs to support the mounting member, said pins being slidable in one of said members to provide for relative expansion between said members, and means for supplying fluid to said bearing including a passage through one of said pins through which fluid may be admitted to the mounting member.

5. A turbine construction including a housing member, a rotor, a bearing for said rotor, a mounting member for said bearing separate from and located within the housing, said mounting member having legs between which is a path for power fluid, removable pins extending inwardly from said housing member and fitting within the legs to support the mounting member, said pins being slidable in one of said members to provide for relative expansion between said members, a number of said pins having longitudinal passages therein for supplying fluid to and removing fluid from within the mounting member.

6. A turbine construction including a housing member, a rotor, a bearing for said rotor, a mounting member for said bearing separate from and located within the housing, said mounting member having legs between which is a path for power fluid, removable pins extending inwardly from said housing member and fitting within the legs to support the mounting member, said pins being slidable in one of said members to provide for relative expansion between said members, said rotor having a recess therein through which coolant is circulated from within the mounting member, and means for supplying lubricant to said bearing and coolant for said rotor through the pins in said legs, said pins having longitudinal passages therein through which coolant and lubricant is circulated from the housing to the mounting member.

7. A turbine construction including a housing member, a rotor within the housing member, a bearing for said rotor, a mounting member for said bearing, a labyrinth seal surrounding said rotor adjacent to said bearing, removable pins extending inwardly from the housing member and engaging said mounting member to support the mounting member within and spaced from the housing member, said pins being slidable within one of said members to provide for relative expansion therebetween, and means for admitting one fluid to said seal and another fluid to said bearing, said last means including longitudinal passages in said pins and a passage in said mounting from the inner end of one of said pins to the seal.

8. A turbine construction including a housing member, a rotor within the housing member, a bearing for said rotor, a mounting member for said bearing, a labyrinth seal surrounding said rotor adjacent to said bearing, removable pins extending inwardly from the housing member and engaging said mounting member to support the mounting member within and spaced from the housing member, said pins being slidable within one of said members to provide for relative expansion therebetween, and means for admitting one fluid to said seal and another fluid to said bearing, said last means including longitudinal passages in said pins and a passage in said mounting from the inner end of one of said pins to the seal, said housing having passages therein communicating with the outer ends of the passages in said pins through which the fluids are admitted to the passages in the pins.

9. A turbine construction including a housing member, a rotor within the housing member, a bearing for said rotor, a mounting member located within the housing and supporting said bearing, a labyrinth seal, said seal surrounding said rotor adjacent to the bearing, a part of said seal being carried by said mounting member, said mounting member having legs projecting substantially radially outwardly therefrom and between which is a path for power fluid, removable pins extending inwardly from the housing member and engaging said legs for supporting the mounting member within and spaced from the housing, said pins being slidable in one of said members to provide for relative expansion therebetween, and means for admitting fluid to said seal including a longitudinal passage in one of said pins and a cooperating passage within said mounting member.

10. A turbine construction including a housing member, a rotor within the housing member, a bearing for said rotor, a mounting member located within the housing and supporting said bearing, a labyrinth seal, said seal surrounding said rotor adjacent to the bearing, a part of said seal being carried by said mounting member, said mounting member having legs projecting substantially radially outwardly therefrom and between which is a path for power fluid, removable pins extending inwardly from the housing member and engaging said legs for supporting the mounting member within and spaced from the housing, said pins being slidable in one of said members to provide for relative expansion therebetween, and means for admitting one fluid to said seal and another fluid to said bearing, said means including longitudinal passages in said pins and an interconnecting passage in said mounting member between the inner end of one of said pins and the seal.

11. A turbine including a housing member, a casing within the housing member having nozzles, a rotor within the casing having blades cooperating with the nozzles, a bearing mounting for one end of said rotor, a mounting member for said bearing located within and separate from the housing, pins extending inwardly from said housing member and fitting within the mounting member for supporting the mounting member within and spaced from the housing member, said pins being slidable in one of said members to provide for relative expansion between said members, a fluid pump located in said housing at a point spaced from the pins, and means providing a fluid connection from the pump to the bearing in the mounting member including a passage in said housing communicating with the outer end of one of said pins, and a passage in said one pin.

12. A turbine construction including a housing member, a rotor, a bearing for said rotor, a mounting member for said bearing located within the housing member, said mounting member having legs between which is a path for hot power fluid, pins extending inwardly from said housing member and fitting in the legs to support the mounting member, said pins being slidable in one of said members to provide for relative expansion therebetween, said housing member having bores through which the pins may be inserted, and means for supplying lubricant to said bearing including a passage through one of said pins, and a shell around the leg with which said one pin engages to prevent overheating of the fluid passing through said one pin.

13. A turbine construction including a housing member, a rotor, a bearing for said rotor, a mounting member for said bearing located within the housing member, said mounting member having legs between which is a path for hot power fluid, pins extending inwardly from said housing member and fitting in the legs to support the mounting member, said pins being slidable in one of said members to provide for relative expansion therebetween, said housing member having bores through which the pins may be inserted, and means for admitting fluid to said mounting member including a passage in one of said legs and a heat shield around said one leg to prevent overheating of the fluid passing through said one pin.

14. A turbine construction including a housing member, a rotor within the housing member, a bearing for said rotor, a mounting member for said bearing located within the housing member, a labyrinth seal around said rotor adjacent to said bearing, a part of said seal being carried by said mounting member, said mounting member having legs projecting substantially radially and between which is a path for hot power fluid, pins extending from the housing member and fitting within said legs for supporting the mounting member within and spaced from the housing member, said pins being slidable in one of said members to provide for relative expansion therebetween, and means for admitting one fluid to said seal and another fluid to said bearing, said last means including longitudinal passages in said pins and legs and shields around said legs to prevent overheating of the fluids therein.

RICHARD S. BUCK.
WALTER A. LEDWITH.

REFERENCES CITED

The following references are of record in the file of this patent:

UNITED STATES PATENTS

| Number | Name | Date |
| --- | --- | --- |
| 1,253,940 | Coatalen | Jan. 15, 1918 |
| 1,328,234 | Krogh | Jan. 13, 1920 |
| 1,780,804 | Ward | Nov. 4, 1930 |
| 1,966,855 | Gregg | July 17, 1934 |
| 2,223,847 | Engdahl | Dec. 3, 1940 |

FOREIGN PATENTS

| Number | Country | Date |
| --- | --- | --- |
| 108,134 | Switzerland | Dec. 16, 1923 |
| 456,738 | Great Britain | Nov. 13, 1936 |